(12) United States Patent
Luthra et al.

(10) Patent No.: US 10,822,998 B2
(45) Date of Patent: Nov. 3, 2020

(54) HIGH TEMPERATURE TOLERANT CERAMIC MATRIX COMPOSITES AND ENVIRONMENTAL BARRIER COATINGS

(71) Applicant: General Electric Company, Schenectady, NY (US)

(72) Inventors: Krishan Lal Luthra, Niskayuna, NY (US); Don M. Lipkin, Niskayuna, NY (US); Julin Wan, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/772,883

(22) PCT Filed: Mar. 4, 2014

(86) PCT No.: PCT/US2014/020388
§ 371 (c)(1),
(2) Date: Sep. 4, 2015

(87) PCT Pub. No.: WO2014/138108
PCT Pub. Date: Sep. 12, 2014

(65) Prior Publication Data
US 2016/0017749 A1    Jan. 21, 2016

Related U.S. Application Data

(60) Provisional application No. 61/772,675, filed on Mar. 5, 2013.

(51) Int. Cl.
*C04B 35/565*    (2006.01)
*F01D 25/00*    (2006.01)
(Continued)

(52) U.S. Cl.
CPC .......... *F01D 25/005* (2013.01); *C04B 35/565* (2013.01); *C04B 41/009* (2013.01);
(Continued)

(58) Field of Classification Search
CPC ........ F01D 25/005; F01D 5/288; F01D 5/284; F01D 5/282; C04B 41/89; C04B 41/009;
(Continued)

(56) References Cited

U.S. PATENT DOCUMENTS 6,235,379 B1 *    5/2001    Kameda ................ C04B 35/573
                                                    428/293.4
6,299,988 B1 *    10/2001    Wang .................... C04B 35/573
                                                    428/632
(Continued)

FOREIGN PATENT DOCUMENTS

EP    0320927 A1    6/1989
EP    0798281 A3    1/1998
(Continued)

OTHER PUBLICATIONS

Boo et al., "High vacuum chemical vapor deposition of cubic SiC thin films on Si 001 substrates using single source precursor", Surface and Coatings Technology, vol. 131, 2007, pp. 147-152. (Year: 2007).*

(Continued)

*Primary Examiner* — Jonathan C Langman
(74) *Attorney, Agent, or Firm* — Dority & Manning, P.A.

(57) ABSTRACT

High-temperature machine components, more particularly, articles capable of operating in high-temperature environments, including for example turbines of gas engines, may be formed of a high temperature ceramic matrix composite that includes a ceramic substrate including silicon; an environmental barrier coating system including a silicon containing bond coat; and a diffusion barrier layer of a carbide or a nitride between the substrate of the article and the silicon bond coat of the environmental barrier coating system. The diffusion barrier layer selectively prevents or reduces the diffusion of boron and impurities from the (Continued)

substrate to the bond coat of the environmental barrier coating system.

20 Claims, 2 Drawing Sheets

(51) Int. Cl.
  *C04B 41/89* (2006.01)
  *C04B 41/00* (2006.01)
  *F01D 5/28* (2006.01)
  *C04B 41/52* (2006.01)

(52) U.S. Cl.
  CPC .............. *C04B 41/52* (2013.01); *C04B 41/89* (2013.01); *F01D 5/282* (2013.01); *F01D 5/284* (2013.01); *F01D 5/288* (2013.01); *C04B 2235/3826* (2013.01); *C04B 2235/428* (2013.01); *F05D 2300/6033* (2013.01); *Y02T 50/672* (2013.01)

(58) Field of Classification Search
  CPC .................. C04B 41/52; C04B 35/565; C04B 2235/3826; C04B 2235/428; F05D 2300/6033; Y02T 50/672
  See application file for complete search history.

(56) References Cited

U.S. PATENT DOCUMENTS

| | | | | |
|---|---|---|---|---|
| 6,312,763 | B1* | 11/2001 | Eaton et al. | 427/452 |
| 7,329,101 | B2 | 2/2008 | Carper et al. | |
| 7,607,213 | B2 | 10/2009 | Bertrand et al. | |
| 8,940,417 | B2 | 1/2015 | Courcot et al. | |
| 2005/0013993 | A1* | 1/2005 | Li et al. | 428/336 |
| 2005/0042461 | A1* | 2/2005 | Li | C04B 41/009 428/446 |
| 2005/0112381 | A1* | 5/2005 | Raybould | C04B 41/52 428/446 |
| 2006/0029733 | A1* | 2/2006 | Bhatia | C04B 41/009 427/248.1 |
| 2006/0110609 | A1* | 5/2006 | Eaton | C04B 41/009 428/446 |
| 2006/0140771 | A1* | 6/2006 | Carper et al. | 416/241 R |
| 2006/0141257 | A1* | 6/2006 | Subramanian | C04B 35/565 428/408 |
| 2008/0264176 | A1 | 10/2008 | Bertrand et al. | |
| 2009/0178413 | A1* | 7/2009 | Lee | C04B 41/009 60/752 |
| 2011/0052925 | A1 | 3/2011 | Sarrafi-Nour et al. | |
| 2013/0167374 | A1* | 7/2013 | Kirby et al. | 29/888.02 |
| 2013/0183580 | A1 | 7/2013 | Kako et al. | |
| 2015/0079371 | A1* | 3/2015 | Nakada | C04B 41/89 428/215 |
| 2015/0251959 | A1* | 9/2015 | Goujard et al. | 416/241 R |

FOREIGN PATENT DOCUMENTS

| | | | |
|---|---|---|---|
| EP | 1748089 A1 | 1/2007 | |
| EP | 1930548 A2 | 6/2008 | |
| EP | 1044946 A2 | 10/2011 | |
| JP | H01-224286 A | 9/1989 | |
| JP | H08-217576 A | 8/1996 | |
| JP | 10101446 | 4/1998 | |
| JP | H10101446 A | 4/1998 | |
| JP | 2000-073171 A | 3/2000 | |
| JP | 2000-247745 A | 9/2000 | |
| JP | 2006189031 A | 7/2006 | |
| JP | 2006-225832 A | 8/2006 | |
| JP | 2008298769 A | 12/2008 | |
| JP | 2012-513946 A | 6/2012 | |
| JP | WO2013183580 | * 12/2013 | ............. B32B 18/00 |
| WO | 0025022 A1 | 5/2000 | |
| WO | 2013183580 A1 | 12/2013 | |

OTHER PUBLICATIONS

International Search Report and Written Opinion issued in connection with corresponding PCT application PCT/US2014/020388, dated Jun. 17, 2014.

Machine Translation and Notification of Reasons for Refusal issued in connection with corresponding JP Application No. 2015-561557 dated Jan. 30, 2018.

Schroeder et al., "Nitrogen Doping of Fused Silica and Silicate Glasses: A Study of Transport and Optical Properties", Journal of Non-Crystalline Solids, vol. No. 102, Issue No. 1-3, pp. 181-195, Jun. 1, 1988.

Ciszek et al., "Effect of Nitrogen Doping on Microdefects and Minority Charge Carver Lifetime of High-Purity, Dislocation-Free and Multicrystalline Silicon", Solar Energy Materials and Solar Cells, vol. No. 41-42, pp. 61-70, Jun. 1996.

Ehara et al., "The Effect of Nitrogen Doping on the Structure of Cluster or Microcrystalline Silicon Embedded in Thin SiO2 Films", Thin Solid Films, vol. No. 346, pp. 275-279, Issues No. 1-2, Jun. 1, 1999.

Forsberg et al., "Nitrogen Doping of Epitaxial Silicon Carbide", Journal of Crystal Growth, vol. No. 236, Issue No. 1-3, pp. 101-112, Mar. 2002.

Temple-Boyer et al., "Properties of Nitrogen Doped Nitrogen Doped Silicon Films Deposited by Low Pressure Chemical Vapour Deposition from Disilane and Ammonia", Thin Solid Films, vol. No. 414, Issue No. 1, pp. 13-17, Jul. 1, 2002.

Chinese Office Action Corresponding to Application No. 201480012286.3 dated Sep. 27, 2016.

Chinese Office Action Corresponding to Application No. 201480012286.3 dated Sep. 5, 2017.

European Office Action Corresponding to Application No. 14712897.9 dated Oct. 10, 2018.

Chinese Office Action Corresponding to Application No. 201480012286.3 dated Oct. 31, 2018.

Chinese Office Action Corresponding to Application No. 201480012286.3 dated Apr. 16, 2019.

European Office Action Corresponding to Application No. 14712897.9 dated Jul. 31, 2019.

* cited by examiner

HIGH TEMPERATURE TOLERANT CERAMIC MATRIX COMPOSITES AND ENVIRONMENTAL BARRIER COATINGS

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight substrate materials with even higher temperature capability have been proposed.

Ceramic matrix composites (CMCs) are a class of materials that offer a good alternative. CMCs comprise fiber reinforcement made of refractory fibers, densified with a ceramic matrix. They are being widely considered for use in the aerospace industry. One example of such composites is SiC—SiC composites comprising a Si—SiC matrix and SiC fibers, wherein the matrix is densified by silicon melt infiltration. However, the upper use temperature of the current system is limited to about 2400 F. It is desirable to increase the temperature limit of such composites to higher temperatures.

CMCs can be coated with environmental barrier coatings (EBCs) and/or thermal barrier coatings (TBCs) to protect them from the harsh environment of high temperature engine sections. Environmental barrier coatings (EBCs) are applied to silicon-bearing materials and other material susceptible to attack by reactive species, such as high temperature water vapor. EBCs provide protection by prohibiting contact between the environment and the surface of the material. EBCs applied to silicon-bearing materials, for example, are designed to be relatively stable chemically in high-temperature, water vapor-containing environments. Thermal barrier coatings (TBCs), on the other hand, are generally used to reduce the substrate temperature by maintaining a temperature gradient across the thickness of the TBCs. In some situations, EBCs can also function as TBCs. The EBC system typically contains a bond coat comprising elemental silicon or a silicon alloy.

The silicon of the substrate contains impurities that can reduce the life and the temperature capability of the CMC and the EBC, and hence of the CMC/EBC system. Accordingly, there is a need in the art for CMC with increased life and temperature capabilities.

SUMMARY OF THE INVENTION

Aspects of the present disclosure increase the life and temperature capability of the CMC/EBC component. The inventors of the present disclosure teach improved CMC/EBC systems.

One aspect of the present disclosure is a high temperature operable ceramic matrix composite, comprising: a ceramic substrate comprising silicon; an environmental barrier coating comprising a bond coat comprising silicon; and a diffusion barrier layer of a carbide or a nitride between the substrate and the silicon bond coat of the environmental barrier coating, wherein the diffusion barrier layer selectively prevents or reduces the diffusion of boron and other undesirable impurities from the substrate to the silicon bond coat of the environmental barrier coating system.

In one embodiment, the substrate comprises a SiC—SiC ceramic matrix composite made by silicon melt infiltration. In another embodiment, the silicon in the substrate is high purity. Silicon used for melt infiltration may contain other elements that may be added intentionally or may enter as contaminants. For example, boron is added intentionally to the silicon used in melt infiltration while the concentration of other impurities that lower the melting temperature of silicon can be less than 1% (i.e., excluding boron). In one embodiment, the silicon of the bond coat is deposited by chemical vapor deposition or by plasma spraying or by Electron Beam Physical Vapor deposition (EB-PVD). In one embodiment, the high temperature operable ceramic matrix composite further comprises an environmental barrier coating with at least one layer of at least one Rare Earth Disilicate ($RE_2Si_2O_7$) comprising Sc, Y, La, Ce, Pr, Nd, Pm, Sm, Eu, Gd, Tb, Dy, Ho, Er, Tm, Yb and/or Lu.

In one embodiment, the diffusion barrier layer is silicon carbide or silicon nitride and the silicon carbide or silicon nitride may be crystalline, amorphous or a mixture, and wherein the layer of silicon carbide or silicon nitride separating the substrate from the environmental barrier coating is about 1 micrometer to about 150 micrometers thick. In another embodiment, the ceramic matrix composite is operable at temperatures of up to about 2550 F, and a bond coat temperature of up to about 2570 F.

In one embodiment, the difference between the coefficient of thermal expansion of the substrate and the coefficient thermal expansion of the environmental barrier coating is no more than about 20%. In another embodiment, the substrate is a ceramic matrix composite, the bond coat has a thickness of about 10 μm to about 500 μm, and the thickness of the diffusion barrier is from about 1 μm to about 150 μm.

In one aspect, the present disclosure is directed to a method for fabricating a high temperature operable turbine engine component, said method comprising: providing a silicon containing substrate having a first coefficient of thermal expansion, wherein impurities, except for boron, have been substantially removed from the substrate; and bonding a bond coat to at least a portion of an outer surface of the component, wherein the bond coat comprises a layer of silicon, and wherein the bond coat has a second coefficient of thermal expansion; and providing a diffusion barrier of a carbide or a nitride between the silicon containing substrate and the EBC system, so as to limit communication of undesirable species/elements between the substrate and the EBC system.

In one embodiment, the substrate comprises a SiC—SiC ceramic matrix composite material. The method of the present disclosure can, in one embodiment, further comprise including at least one rare earth silicate in the environmental barrier coating. In one embodiment, the diffusion barrier layer of the carbide or nitride is crystalline, and wherein the carbide or nitride layer separating the substrate from the environmental barrier coating is about 1 micrometer to about 150 micrometers thick. In one embodiment, the ceramic matrix composite is operable at temperatures of up to about 2550 F, and a bond coat temperature of up to about 2570 F. In one embodiment, the concentration of impurities, other than boron, of the silicon in the substrate is less than 1%, and, in an embodiment is less than 0.1%. In one embodiment, instead of the bond coat of the environmental barrier coating system comprising a layer of silicon, the bond coat of the environmental barrier coating comprises a mixed layer of silicon and an oxide.

These and other aspects, features, and advantages of this disclosure will become apparent from the following detailed description of the various aspects of the disclosure taken in conjunction with the accompanying drawings.

BRIEF DESCRIPTION OF THE DRAWINGS

The subject matter, which is regarded as the inventions, is particularly pointed out and distinctly claimed in the claims at the conclusion of the specification. The foregoing and other features, aspects, and advantages of the disclosure will be readily understood from the following detailed description of aspects of the inventions taken in conjunction with the accompanying drawings, wherein:

DETAILED DESCRIPTION

Figure 1:
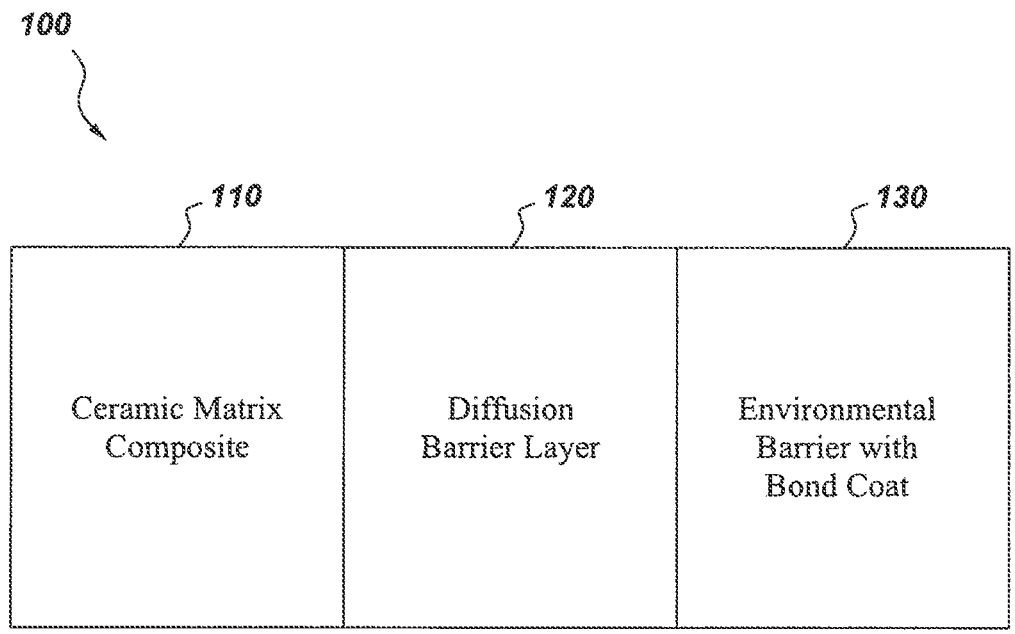
FIG. 1 shows a schematic representation of ceramic substrate, an EBC system comprising a bond coat, and a diffusion barrier layer of a carbide or nitride between the ceramic substrate and the bond coat of the EBC system.

Reference will be made below in detail to exemplary embodiments of the invention, examples of which are illustrated in the accompanying drawings. Wherever possible, the same reference numerals used throughout the drawings refer to the same or like parts.

Embodiments of the invention described herein relate to CMC and EBC systems. As used herein, "CMCs" refer to silicon-containing composites, more specifically those comprising a SiC fiber and a SiC containing matrix. Some examples of silicon-containing CMCs acceptable for use herein can include, but should not be limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber.

As used herein, the term "barrier coating(s)" refers to environmental barrier coatings (EBCs). The barrier coatings herein may be suitable for use on a ceramic substrate found in high temperature environments, such as those present in gas turbine engines. "Substrate component" or simply "component" refers to a component made from CMCs and/or monolithic ceramics comprising silicon.

As used herein, references to the term "bonded" are to be understood to include direct and indirect bonding through another layer, such as a bond coat or an intermediate layer.

Ceramic matrix composites (CMCs) are a class of materials that consist of a reinforcing material surrounded by a ceramic matrix phase. Such materials, along with certain monolithic ceramics (i.e. ceramic materials without a reinforcing material), are being contemplated for use in applications exceeding the temperature capability of current systems. Some examples of common CMC matrix materials can include silicon, silicon carbide, and silicon nitride and mixtures thereof. Some examples of common CMC reinforcing materials can include, but should not be limited to silicon carbide, silicon nitride, silicon oxicarbide, and silicon oxinitride. CMC materials comprise fiber reinforcement made of refractory fibers, typically carbon or ceramic fibers, and densified with a ceramic matrix, typically made of SiC. Some examples of silicon containing monolithic ceramics may include silicon carbide, silicon nitride, and silicon aluminum oxynitride (SiAlON).

Using these ceramic materials can decrease the weight and increase the temperature capability, yet maintain the strength and durability, of turbine components. Therefore, such materials are currently being considered for many gas turbine components used in higher temperature sections of gas turbine engines, such as airfoils (e.g. compressors, turbines, and vanes), combustors, shrouds and other like components that would benefit from the lighter weight and higher temperature capability that these materials can offer.

CMC and monolithic ceramic components can be coated with environmental barrier coatings (EBCs) and/or thermal barrier coatings (TBCs) to protect them from the harsh environment of high temperature engine sections. EBCs can provide a dense, hermetic seal against the corrosive gases in the hot combustion environment while TBCs can set up a thermal gradient between the coating surface and the substrate, which may be actively cooled. In this way, the temperature of the component can be reduced below the surface temperature of the TBC. In some instances, a TBC may also be deposited on top of an EBC in order to reduce the surface temperature of the EBC to below the surface temperature of the TBC. This approach lowers the operating temperature at which the EBC must perform and, as a result, can increase the operating life of the EBC.

Currently, EBCs may include a multi-layer structure as disclosed in, for example, commonly assigned U.S. 2011/0052925 A1. Together, these layers can provide environmental protection for the component.

TBCs generally consist of refractory oxide materials that are deposited with special microstructures to mitigate thermal or mechanical stresses due to thermal expansion mismatch or contact with other components in the engine environment. These microstructures may include dense coating layers with vertical cracks or grains, porous microstructures, and combinations thereof. Regardless of composition or substrate, most EBCs and/or TBCs can be applied using one or more of air-plasma spraying (APS), slurry dipping, slurry spraying, electrophoretic deposition, chemical vapor deposition (CVD), or electron beam physical vapor deposition (EBPVD).

Melt Infiltrated SiC fiber reinforced SiC-Si matrix composites are presently being contemplated for use in many applications, including in power generating gas turbines and aerospace industry applications including aircraft engines. The upper use temperature for these composites is limited to about 2400 F. It is desirable to increase the temperature limit of such composites to about 2700 F and even higher.

One aspect of the present disclosure is a high temperature operable ceramic matrix composite, comprising: a ceramic substrate comprising silicon; an environmental barrier coating system comprising a silicon bond coat; and a diffusion barrier layer of a carbide or a nitride between the substrate and the silicon bond coat of the environmental barrier coating, wherein the diffusion barrier layer selectively prevents or reduces the diffusion of boron and other impurities from the substrate to the silicon bond coat of the environmental barrier coating system.

The diffusion barrier layer can be silicon carbide or silicon nitride, and the layer of silicon carbide or silicon nitride separating the substrate from the environmental barrier coating can be about 1 µm to about 150 µm thick. In one example, instead of the bond coat of the environmental barrier coating comprising a layer of silicon followed by a layer of silicon and oxide (e.g. a thermally grown oxide, or a mixture of Si and an oxide, or a Si—O compound), the bond coat of the environmental barrier coating system comprises a mixed layer of silicon and an oxide.

The instant application further teaches a method for increasing the upper use temperature to 2700 F or higher by increasing the temperature limit of the CMC to 2550 F and using a TBC system capable of interface temperatures of up to about 2550 F. The ceramic matrix composite of the present disclosure can, in one example, be operable at temperatures of up to about 2550 F, and a bond coat temperature of up to about 2570 F. Moreover, the present disclosure teaches that it is possible to increase the upper use temperature of the CMC by eliminating substantially all impurities from silicon, except for boron. The silicon in the substrate is high purity, and in a related example, the concentration of impurities that lower the melting temperature of silicon, with the exception of boron, is less than 1%. In a particular example, the concentration of impurities other than boron of the silicon in the substrate is less than 1%, and, in an embodiment is less than 0.1%.

In one example, the temperature limit of the EBC system can be increased by using a diffusion barrier layer of SiC between the CMC and the bond coat to prevent the diffusion of boron from silicon of the SiC—Si matrix to the silicon bond coat, and by using a high purity silicon bond layer. In one example, the silicon bond coat is replaced with a dual layer of silicon and an oxide such as silica and/or rare earth silicate. The substrate can comprise a SiC—SiC ceramic matrix composite. The silicon can be deposited by chemical vapor deposition or by plasma spraying or by Electron Beam Physical Vapor deposition (EB-PVD).

In one aspect, the present disclosure is directed to fabricating a high temperature capable turbine engine component by providing a silicon containing substrate having a first coefficient of thermal expansion, wherein impurities, except for boron, have been substantially removed from the substrate; bonding an EBC bond coat to at least a portion of an outer surface of the component, wherein the bond coat comprises a layer of silicon or silicon followed by a layer of silicon and an oxide, and wherein the EBC bond coat has a second coefficient of thermal expansion; and providing a diffusion barrier of a carbide or a nitride between the silicon containing substrate and the EBC bond coat, such that the two are separated from each other.

The present disclosure also teaches that the difference between the coefficient of thermal expansion of the substrate and the coefficient thermal expansion of the environmental barrier coating can be no more than about 20%. In one example, for a multi-layer oxide coating system, a thin layer of higher expansion material is used but the thicker layer expansion coefficient is within about 20%. Further, the substrate can be a ceramic matrix composite, the EBC bond coat can have a thickness of about 10 µm to about 500 µm, and the thickness of the diffusion barrier can be from about 1 micron to about 150 microns.

Referring to FIG. 1, in one embodiment, an environmental barrier coating system 130 is applied to a silicon-based material, such as a turbine engine component 100 fabricated from a CMC substrate material 110. Alternatively, turbine engine component 100 is fabricated from a silicon nitride (Si$_3$N$_4$) substrate material (not shown). It is apparent to those skilled in the art and guided by the teachings herein provided that turbine engine component 100 can be fabricated from any suitable silicon-based material. In one embodiment, environmental barrier coating system 130 includes a silicon bond coat between the EBC and the CMC. A diffusion barrier layer 120 is disposed between the CMC 110 and the EBC system 130. In a particular embodiment, the bond coat has a coefficient of thermal expansion matched to substrate material 110 and/or intermediate layer 120.

Figure 2:
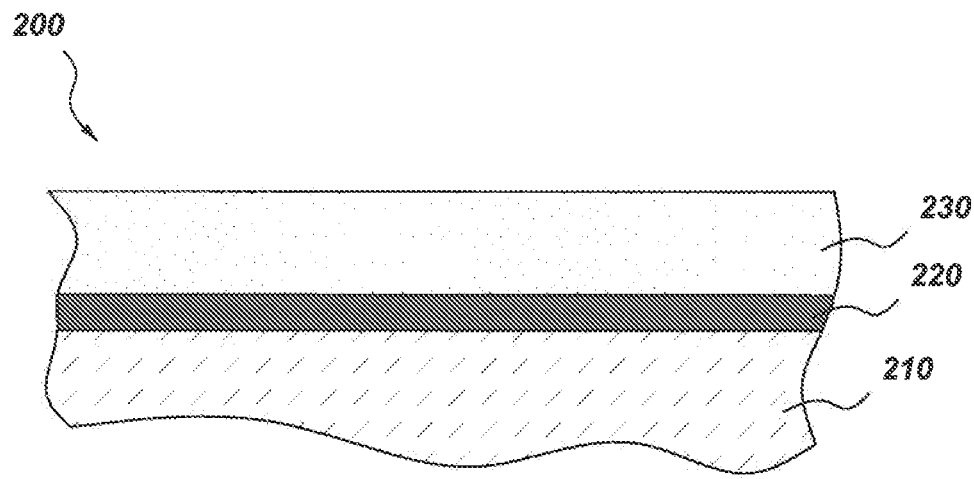
FIG. 2 shows a partial sectional side view of an article coated with an environmental barrier coating and diffusion barrier layer, according to one embodiment of the present disclosure.

FIG. 2 shows a partial sectional side view of an article coated with an environmental barrier coating and diffusion barrier layer, according to one embodiment of the present disclosure. Here, an environmental barrier coating system 230 is applied to a silicon-based material, such as a turbine engine component 200 fabricated from a CMC substrate material 210. It is apparent to those skilled in the art and guided by the teachings herein provided that turbine engine component 200 can be fabricated from any suitable silicon-based material. In one embodiment, environmental barrier coating system 230 includes a silicon bond coat applied to or deposited on CMC substrate material 210; in this particular example, there is a diffusion barrier layer 220 between the EBC and the CMC. In one embodiment, the bond coat has a coefficient of thermal expansion matched to substrate material 210 and/or intermediate layer 220.

Figure 3:
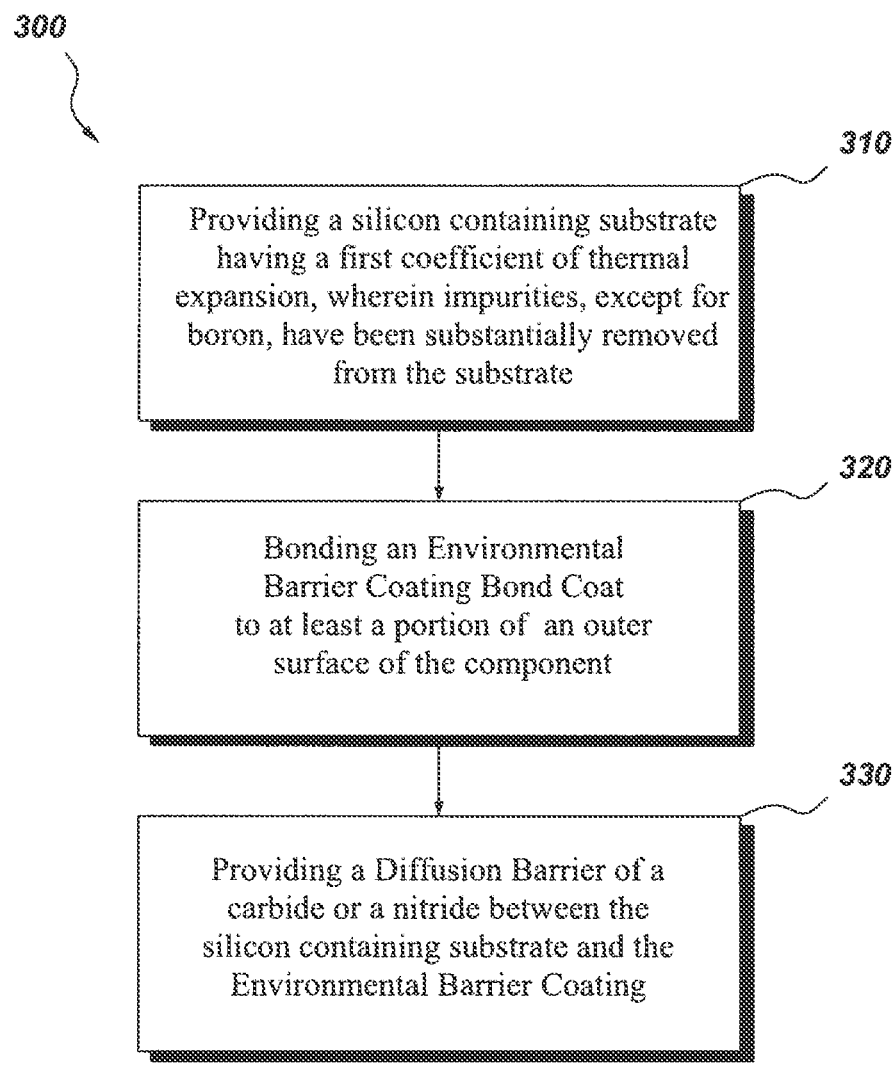
FIG. 3 shows a flow chart, in accordance with aspects of the disclosure, illustrating a method for fabricating a high temperature operable turbine engine component.

FIG. 3 shows a flow chart 300 in accordance with aspects of the disclosure, illustrating a method for fabricating a high temperature operable turbine engine component. The method includes providing a silicon containing substrate having a first coefficient of thermal expansion, wherein impurities, except for boron, have been substantially removed from the substrate 310. The process further comprises bonding an environmental barrier coating bond coat to at least a portion of an outer surface of the component. The fabrication method further includes providing a diffusion barrier of a carbide or a nitride 330 between the silicon containing substrate and the environmental barrier coating.

SiC—Si matrix composites are made by melt infiltration of silicon into a preform containing coated SiC fiber and a porous matrix of SiC and carbon. On silicon infiltration, silicon reacts with carbon to form silicon carbide and the remaining pores are filled with residual silicon, such that residual silicon comprises about 10% of the matrix. The silicon used for infiltration contains significant concentrations (e.g. several percent) of boron, which is intentionally added. There may be other impurities present in the silicon. In addition, some other dopants may also be present in the matrix. The impurities, including boron, present in the silicon used for infiltration get concentrated into residual silicon of the matrix of the composite. The silicon impurities can originate from the silicon source used for infiltration, carbon fabric/wicks used for infiltration aids, and possibly furnace contaminants.

These impurities present in silicon in the SiC—Si matrix can lower the melting temperature of silicon thereby lowering its use temperature. Preventing or reducing impurities that lower the melting temperature of silicon, other than boron, can increase the melting temperature to the eutectic temperature of about 2530 F in the silicon-boron system. At long times and/or high temperatures, boron present in the matrix silicon can diffuse to the bond coat silicon of EBC system. The boron increases the oxidation rate of silicon and thus negatively influences the life of the EBC. Diffusion of boron and other elements from the matrix of the CMC to the silicon bond coat of the EBC can be prevented or reduced by using a diffusion barrier layer of silicon carbide between the CMC and the EBC.

At temperatures of 2550 F or above, and approaching the melting temperature of pure silicon (2570 F), creep of silicon bond coat can potentially be an issue. Where this is the case, the inventors of the instant application disclose that this creep can be reduced by using a bond layer of silicon and a silicide, such as molybdenum silicide, or by using a bond layer of silicon and an oxide compatible with silicon. Rare earth silicates fall into this category. Thus, the method of the present disclosure can further comprise adding at least one rare earth silicate to the environmental barrier coating. The high temperature operable ceramic matrix composite can further comprise an environmental barrier coating with at least one layer of at least one Rare Earth Disilicate ($RE_2Si_2O_7$) selected from the group consisting of Sc, Y, La, Ce, Pr, Nd, Pm, Sm, Eu, Gd, Tb, Dy, Ho, Er, Tm, Yb and Lu.

One aspect of the present disclosure is a CMC system that is processed using ingredients that contain essentially no impurities other than boron, a diffusion barrier layer of silicon carbide between the CMC and the EBC system, and a bond layer of high purity silicon or high purity silicon with silicide or oxide additions to reduce the potential creep problem associated with silicon at temperatures of 2550 F or above.

The CMC/EBC system as taught herein increases the temperature limit of the system from a current limitation of about 2400 F for the matrix of the CMC as well as the bond coat to a CMC/EBC system where the upper use temperature is increased to about 2550 F. The surface of the EBC can operate at temperatures of upwards of 2700 F. This ability to increase the temperature limit of the CMC/EBC helps improve, for example, the specific fuel consumption (SFC) as well as thrust to weight ratio of aircraft engines and efficiency of industrial gas turbines.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled.

In the appended description, the terms "including" and "in which" are used as the plain-English equivalents of the respective terms "comprising" and "wherein." Moreover, in the following claims, the terms "first," "second," etc. if any, are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

While the inventions have been described in detail in connection with only a limited number of embodiments, it should be readily understood that the inventions are not limited to such disclosed embodiments. Rather, the inventions can be modified to incorporate any number of variations, alterations, substitutions or equivalent arrangements not heretofore described, but which are commensurate with the spirit and scope of the invention. Additionally, while various embodiments of the inventions have been described, it is to be understood that aspects of the disclosure may include only some of the described embodiments. Accordingly, the inventions are not to be seen as limited by the foregoing description, but are only limited by the scope of the appended claims.

What is claimed is:

1. An article comprising:
    a ceramic substrate comprising SiC fibers, a porous matrix of SiC, and melt infiltrated silicon and boron within at least some of the pores of the porous matrix;
    an environmental barrier coating system comprising a silicon-containing bond coat, the silicon-containing bond coat comprising silicon and a silicide; and
    a diffusion barrier layer of crystalline silicon nitride 1 micrometer to 150 micrometers thick between the ceramic substrate and the silicon-containing bond coat, the diffusion barrier layer being in direct contact with the ceramic substrate and the silicon-containing bond coat being in direct contact with the diffusion barrier layer; and
    wherein the diffusion barrier layer prevents or reduces diffusion of boron and impurities from the ceramic substrate to the silicon-containing bond coat.

2. The article of claim 1, wherein the ceramic substrate is operable at temperatures of up to 2550 degrees F. without melting.

3. The article of claim 2, wherein a total concentration of impurities other than boron in the silicon of the ceramic substrate is less than 1 atom percent.

4. The article of claim 1, wherein the melt infiltrated silicon comprises about 10% of the ceramic substrate.

5. The article of claim 1, wherein the boron is added intentionally to the melt infiltrated silicone.

6. The article of claim 1, wherein the environmental barrier coating system further comprises at least one layer comprising a rare earth disilicate, the rare earth disilicate having the chemical formula $RE_2Si_2O_7$, wherein RE is selected from among: Sc, Y, La, Ce, Pr, Nd, Pm, Sm, Eu, Gd, Tb, Dy, Ho, Er, Tm, Yb, and Lu.

7. The article of claim 1, wherein the boron is added in a percentage concentration intentionally to the melt infiltrated silicon.

8. The article of claim 1, wherein the melt infiltrated silicon and boron are added to the substrate in a melt infiltration process.

9. The article of claim 8, wherein the melt infiltration process comprises silicon reacting with carbon in a porous matrix to form SiC and melt infiltrated silicon.

10. The article of claim 9, wherein the melt infiltrated silicon comprises about 10% of the ceramic substrate.

11. The article of claim 8, wherein at least a portion of the boron is added intentionally to the melt infiltrated silicon used in the melt infiltration process.

12. The article of claim 1, wherein the article comprises a turbine engine component.

13. The article of claim 1, wherein the surface of the environmental barrier coating system has a temperature limit of up to 2700 degrees F.

14. An article comprising:
a substrate comprising a ceramic matrix composite, the ceramic matrix composite comprising silicon carbide fibers, a porous matrix of silicon carbide, and melt infiltrated silicon and boron within at least some of the pores of the porous matrix, wherein the substrate has a concentration of impurities except boron of less than 1 atom percent;
an environmental barrier coating system comprising a silicon-containing bond coat disposed over the substrate, the silicon-containing bond coat comprising silicon and molybdenum silicide; and
a diffusion barrier layer of crystalline silicon nitride 1 micrometer to 150 micrometers thick between the substrate and the silicon-containing bond coat, the diffusion barrier layer being in direct contact with the substrate and the silicon bond coat being in direct contact with the diffusion barrier layer.

15. The article of claim 14, wherein the environmental barrier coating system further comprises at least one layer comprising a rare earth disilicate, the rare earth disilicate having the chemical formula $RE_2Si_2O_7$, wherein RE is selected from among: Sc, Y, La, Ce, Pr, Nd, Pm, Sm, Eu, Gd, Tb, Dy, Ho, Er, Tm, Yb, and Lu.

16. The article of claim 14, wherein the melt infiltrated silicon and boron are added to the substrate in a melt infiltration process.

17. The article of claim 16, wherein the melt infiltration process comprises silicon reacting with carbon in a porous matrix to form SiC and melt infiltrated silicon.

18. The article of claim 17, wherein the melt infiltrated silicon comprises about 10% of the ceramic substrate.

19. The article of claim 16, wherein at least a portion of the boron is added intentionally to the melt infiltrated silicon used in the melt infiltration process.

20. The article of claim 14, wherein the article comprises a turbine engine component.

* * * * *